Dec. 31, 1929. F. H. VIETS ET AL 1,741,352
APPARATUS FOR ELECTRICAL PRECIPITATION
Filed Sept. 13, 1927 5 Sheets-Sheet 4
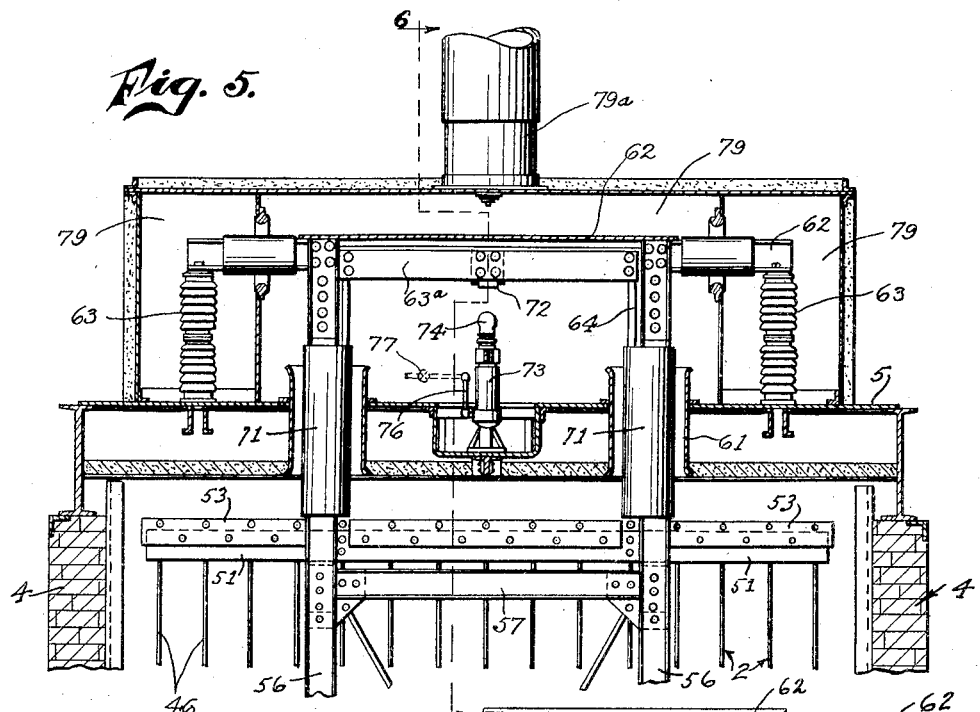
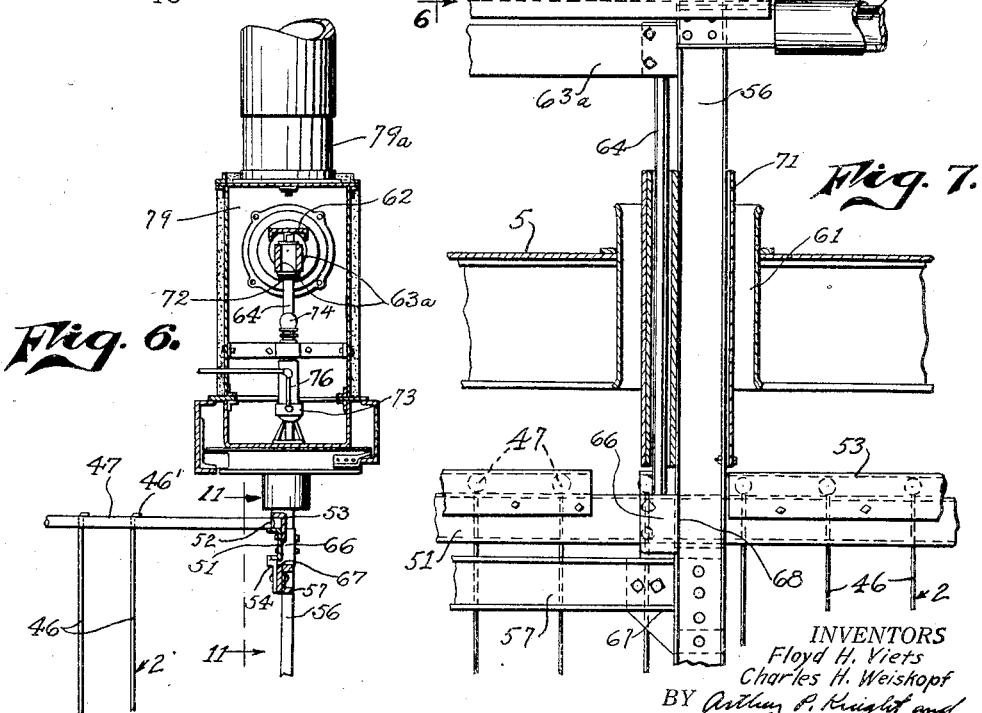
INVENTORS
Floyd H. Viets
Charles H. Weiskopf
BY Arthur P. Knight and
Alfred W. Knight
ATTORNEYS.

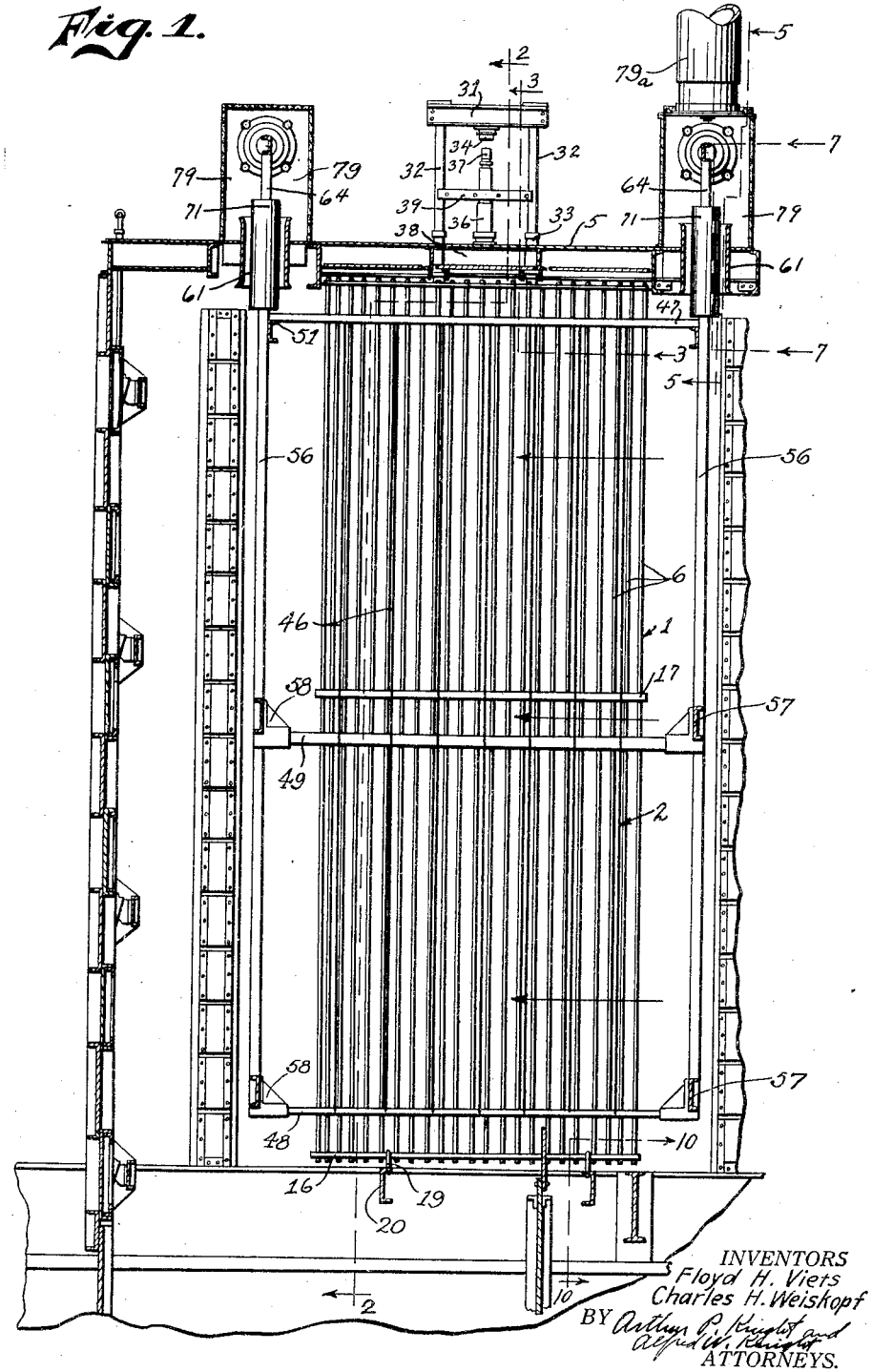

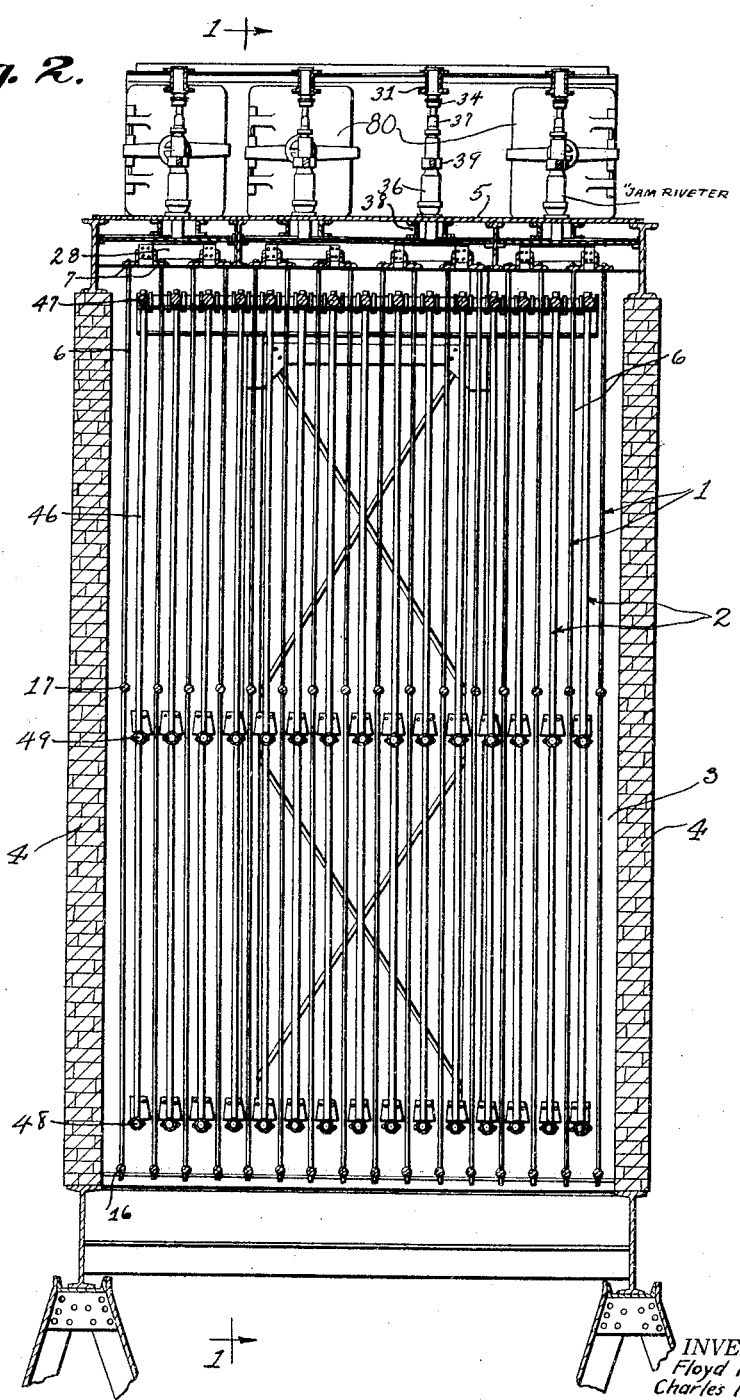

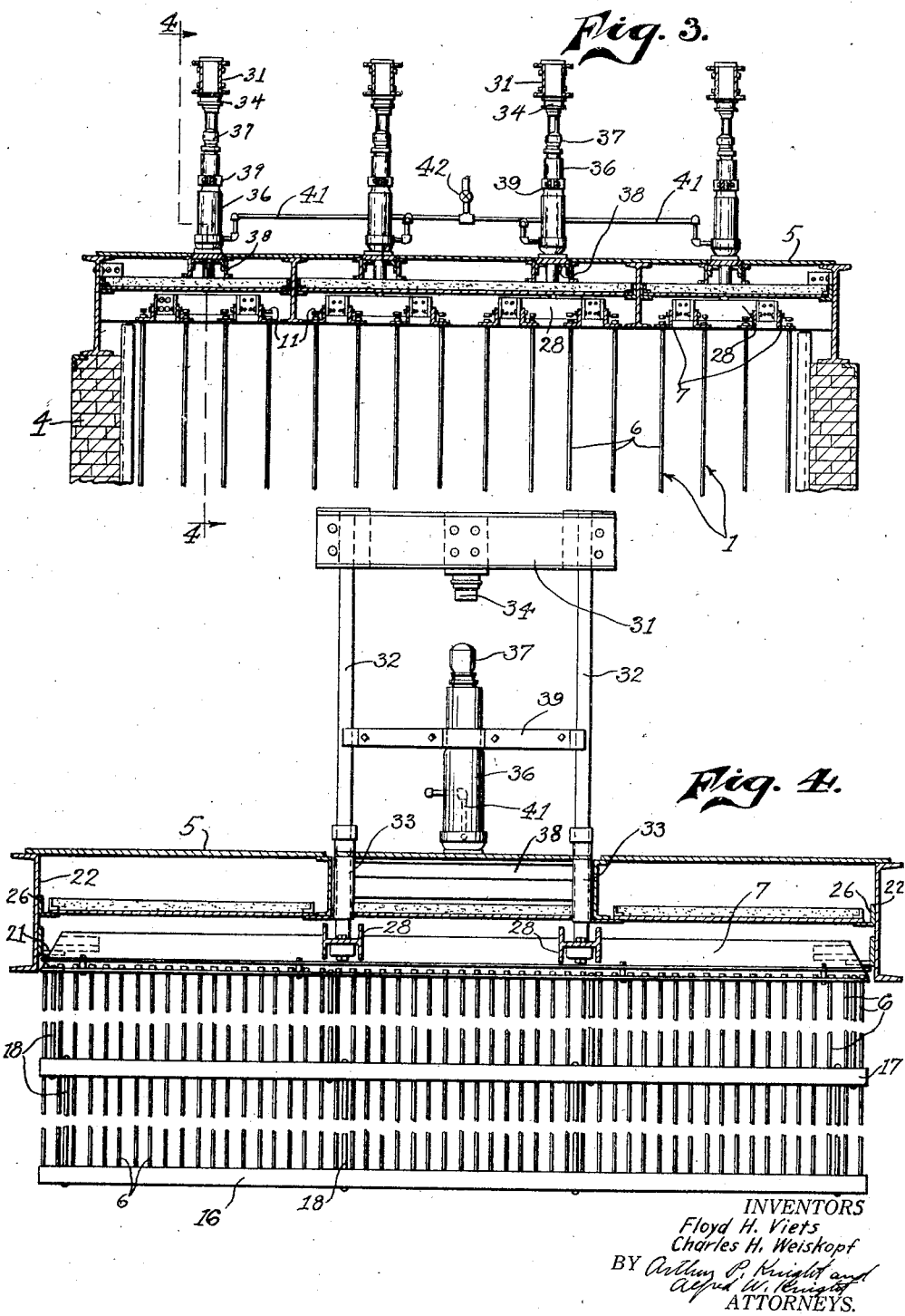

Dec. 31, 1929.                F. H. VIETS ET AL                1,741,352
                    APPARATUS FOR ELECTRICAL PRECIPITATION
                       Filed Sept. 13, 1927        5 Sheets-Sheet 5
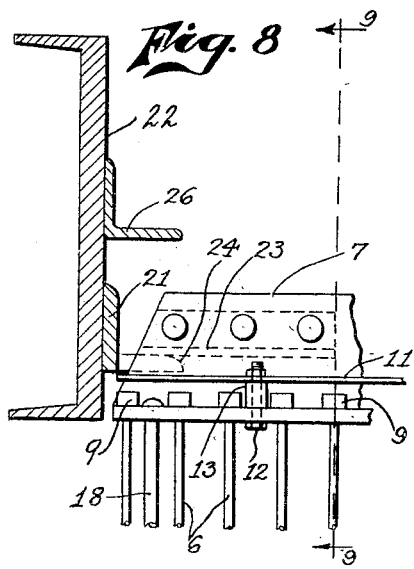
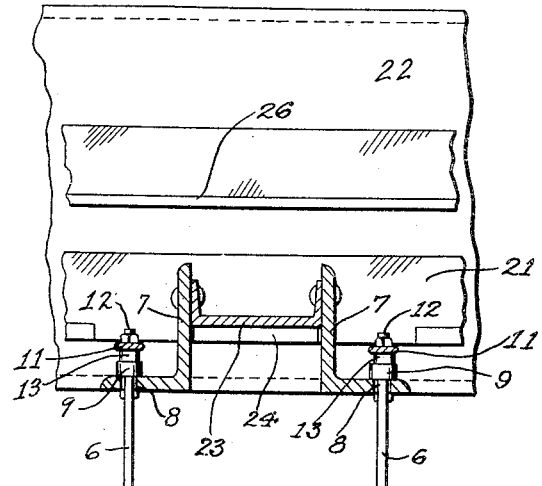
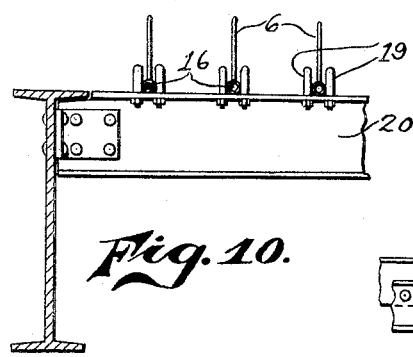
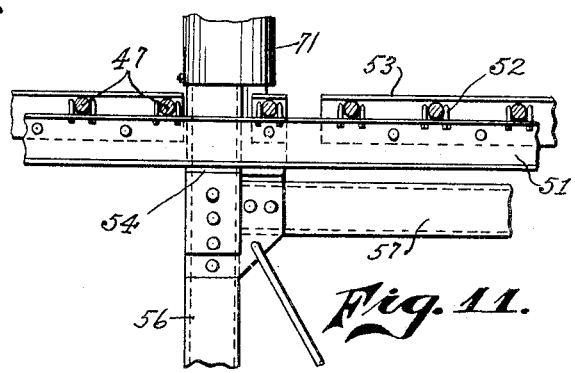
INVENTORS
Floyd H. Viets
Charles H. Weiskopf
BY Arthur P. Knight and
Alfred W. Knight
ATTORNEYS.

Patented Dec. 31, 1929

1,741,352

UNITED STATES PATENT OFFICE

FLOYD H. VIETS, OF GLENDALE, AND CHARLES H. WEISKOPF, OF HAWTHORNE, CALIFORNIA, ASSIGNORS TO INTERNATIONAL PRECIPITATION COMPANY, OF LOS ANGELES, CALIFORNIA, A CORPORATION OF CALIFORNIA

APPARATUS FOR ELECTRICAL PRECIPITATION

Application filed September 13, 1927. Serial No. 219,282.

This invention relates to apparatus for electrical precipitation of suspended material from gases and particularly to means for jarring the electrodes of such apparatus to dislodge material deposited thereon and hence keep such electrodes clean and improve the efficiency of operation thereof.

The apparatus ordinarily used for electrical precipitation comprises collecting electrode means and discharge electrode means spaced and insulated from the collecting electrode means, and means for maintaining a high electric potential between said discharge and collecting electrode means. The discharge electrode means are so constructed as to promote electric discharge therefrom, and for this purpose are generally of small surface area, being commonly formed as wires or fine rods, while the collecting electrodes are made of relatively large surface area and may be formed of plates or screens, or as curtains of relatively closely spaced wires or rods. In the operation of such apparatus, a stream of gas containing suspended material, such as finely divided solid particles, is passed through the electric field thus created between the electrodes and the suspended particles become charged and are driven toward and deposited upon the collecting electrodes. Some of the material so deposited falls off of the electrodes, but a portion of it tends to cling or accumulate thereon, and it has been found that the efficiency of the precipitator is enhanced if the material which tends to cling to the electrodes is removed from time to time, for example by rapping or jarring such electrodes.

According to the present invention either the collecting electrodes or the discharge electrodes, and preferably both, are loosely mounted on suitable supporting means in such manner that they may be lifted from said supporting means and suitable pneumatically operated means are provided for lifting such electrodes off the supporting means and for imparting a rapid jarring or vibrating motion to the electrodes while held off of their supports. The jarring or vibrating motion is preferably applied by a rapid sequence of upward blows against the electrodes or against suitable impact means connected thereto.

The accompanying drawings illustrate embodiments of our invention and referring thereto, Fig. 1 is a longitudinal section of one section of an electrical precipitator provided with electrode cleaning means according to our invention, taken on line 1—1 in Fig. 2.

Fig. 2 is a transverse section thereof on line 2—2 in Fig. 1.

Fig. 3 is a transverse section of the upper portion of the collecting electrode means and the jarring means therefor.

Fig. 4 is a section on line 4—4 in Fig. 3, showing particularly the supporting means for the collecting electrodes.

Fig. 5 is a partial section on line 5—5 in Fig. 1, showing the upper portion of the discharge electrode means and the jarring means therefor.

Fig. 6 is a section on line 6—6 in Fig. 5.

Fig. 7 is a section on line 7—7 in Fig. 1.

Fig. 8 is an enlarged view of the supporting means for the collecting electrodes.

Fig. 9 is a section on line 9—9 in Fig. 8.

Fig. 10 is a detailed view of the means for spacing the lower ends of the collecting electrodes taken on line 10—10 in Fig. 1.

Fig. 11 is a section on line 11—11 in Fig. 6.

The apparatus shown in the drawings comprises a plurality of collecting electrodes 1 and a plurality of discharge electrodes 2 disposed alternately across the precipitating chamber 3 between the side walls 4. The top of the chamber is formed by plates 5. Each collecting electrode is formed as a curtain of vertical elements such as small diameter pipes or rods 6 suspended vertically from a horizontal frame member 7 at their upper ends. The frame member 7 may be an angle bar and the upper ends of pipes or rods 6 may pass through openings 8 in the horizontal flange thereof and may be provided with cap members 9 threaded thereon and resting on the top of said flange to hold said rods in position. In order to limit possible upward movement of the electrode elements 6 within the openings 8 during jarring of the electrodes, a retaining strip 11 is mounted in position over the upper ends thereof as by means of bolts 12 and sleeves 13. The vertical members 6 are preferably spaced at their lower ends as by means of pipes or rods 16 through which said members pass loosely and are also preferably spaced at an intermediate level as by means of a similar spacing member 17. The spacing members 16 and 17 may be suspended from the frame member 7 by means of rods 18. The collecting electrodes may also be kept in proper spaced relation to one another, at their lower ends, by means of upwardly projecting lugs or bolts 19 secured to fixed supports or beams 20 and engaging the sides of lower spacing member 16.

The upper frame member 7 of each collecting electrode may be mounted at its ends on suitable supporting means in such manner as to permit said frame member to be lifted off of said supporting means. Said supporting means may comprise angle bars 21 secured to cross beams 22. The horizontal flanges of angle bars 21 are preferably cut away at the portions in line with the several collecting electrodes so as to permit such electrodes to extend throughout the entire distance between the cross beams 22, and each pair of adjacent frame members 7 may be secured adjacent their ends to a short section of channel iron indicated at 23, which rests upon the portion 24 of angle bar 21. A stop member, such as angle bar 26, is preferably mounted above the supporting member 21 so as to limit the upward movement of the collecting electrodes due to engagement of frame members 7 therewith.

In order to facilitate the jarring of the collecting electrodes we have shown the same as arranged in groups of four, the frame members 7 of each of such groups being secured together by members 28, there being preferably two of such members 28 for each group of collecting electrodes and such members being spaced a suitable distance apart along the length of the collecting electrodes and disposed symmetrically with respect to the center thereof. A lifting yoke is also provided for raising each group of collecting electrodes, said yoke comprising a horizontal member 31 and vertical rods or members 32 securing the ends of said horizontal member to the respective members 28, said rods 32 extending through suitable guiding sleeves 33 secured to the housing in any suitable manner.

An anvil or impact receiving member 34 is secured beneath each of the horizontal yoke members 31 and suitable pneumatic hammer means are provided beneath said impact receiving means for first engaging the same to lift the collecting electrodes off of their supports and then delivering a rapid succession of sharp blows thereto for jarring such electrodes. Such pneumatic hammers are indicated at 36 and are shown as provided with plungers 37, and said hammers are of the well-known type known as "jam riveters" in which the plungers 37 are first forced outwardly a certain distance and are then rapidly vibrated so as to effect the above described jarring action. Riveting hammers of this type are described, for example, in United States Patents No. 917,242, No. 1,029,082, and No. 1,126,096. Suitable supporting means 38 are provided beneath the pneumatic hammers and the same may be further supported by means of bars 39 engaging the rods 32 at their ends. Air pipes 41, controlled by valve 42, are also provided in the usual manner for delivering air under suitable pressure to the pneumatic hammers 36 for operation thereof.

Each discharge electrode 2 comprises a plurality of elongated members such as fine rods or wires 46 suspended from an upper frame member 47 as by bending over the upper ends of such members as shown at 46' in Fig. 6. A bottom frame member 48 and an intermediate frame member 49 are also preferably provided, through which the discharge members 46 pass to assist in holding the same in properly spaced position.

The upper frame members 47 may comprise rods and said rods may be mounted at their ends upon transverse frame members 51 and held in position by means of spacing bolts or lugs 52 secured to said frame member 51. An angle bar 53 is preferably secured to the outer face of frame member 51 in such position that the horizontal flange thereof projects over the ends of rods 47 to hold the same down on to the frame member 51. The frame members 51 are loosely mounted on suitable fixed supporting means such as angle brackets 54 secured to a fixed supporting frame comprising vertical members 56 and horizontal members 57. The discharge electrode frame members 48 and 49 aforesaid are rigidly secured to said rigid supporting frame as by connecting members 58, while the above described mounting of the upper frame members 47 of the discharge electrodes permits said upper frame members together with the transverse frame members 51 to be lifted off of the supporting brackets 54 for the purpose of jarring the electrodes. The vertical members 56 of the fixed supporting frames extend upwardly through openings 61 in the top of the precipitator and are suspended from channel beams 62 mounted on supporting insulators 63.

In order to raise the discharge electrodes off of their supports, a lifting yoke is provided comprising cross members 63ª and rods 64 secured to the ends of said cross members and extending downwardly through openings 61 aforesaid and being secured to the frame members 51 as by means of clamping members 66. Each of the clamping members 66 is preferably provided with a lip 67 projecting inwardly at its lower edge and engaging beneath the frame member 51, and with a lip 68 extending along one side thereof and embracing the vertical frame member 56 so as to guide the electrodes vertically when they are raised off of their supports. Where the frame members 56 and lifting rods 64 pass through openings 61 they are preferably provided with tubular sleeves 71 for preventing arcing therefrom.

An anvil or impact receiving member 72 is mounted at the middle of each of the horizontal yoke members 63ª and pneumatic hammers 73 are mounted beneath the said impact receiving members, said pneumatic hammers being provided with plungers 74, compressed air supply pipes 76, and valve 77, and being of substantially the same type as the hammers 36 above described.

The insulating supports 63 and the supporting beams and jarring mechanism for the high tension or discharge electrodes may be mounted in separate compartments 79 above the precipitating chamber, and doors 80 may be provided for permitting access to such compartments.

It will be noted that all parts of the discharge electrode system and the supporting means therefor are supported by the insulators 63 and are thereby electrically insulated from the collecting electrode system. Any suitable or well-known means may be provided for maintaining a high electric potential between the discharge electrodes and the collecting electrodes. For example the discharge electrode system may be connected to the high tension side of a mechanical rectifier which is connected to receive high voltage alternating current from a transformer and to deliver unidirectional current to the precipitator circuit, the other side of said rectifier and the collecting electrode system being connected together to complete said circuit and being preferably grounded. The pipe 79ª is provided for housing the high tension conductor which is brought in for connection to the discharge electrode system.

In the operation of the above described apparatus a high electric potential is maintained between the discharge and collecting electrodes by the means above referred to and the gas to be treated and containing suspended particles, is passed through the resulting electric field between the electrodes for example in the direction indicated by the arrows in Fig. 1. By the action of such electric field the suspended particles are precipitated in the usual manner on the collecting electrodes. A considerable proportion of the material so precipitated generally falls off of the electrodes readily and may be collected in any suitabe means at the bottom of the precipitation chamber. In general, however, some of the material so deposited on the collecting electrodes does not fall off of its own accord but tends to build up thereon, and if such material is permitted to accumulate to any considerable extent it interferes materially with the efficient operation of the precipitator. Some suspended material is also deposited on the discharge electrode members and also interferes with the precipitating operation. In the apparatus above described the collecting and discharge electrodes may be cleaned from time to time by lifting the electrodes off of their supports and jarring the same.

When it is desired to jar the electrodes of any section of the precipitator the power is cut off from that section and the gas flow is also preferably shut off through such section by operation of suitable damper means not shown. Such interruption of the electric circuit and of the gas flow may be effected by manual operation or may be automatically effected. The collecting electrodes may then be jarred by opening valve 42 to supply compressed air to the pneumatic hammers 36, whereupon the plungers 37 are first advanced upwardly to engage impact receiving members 34, and sufficiently beyond this point to lift the upper frame members 7 and the collecting electrodes carried thereby off of their supports 21. The pneumatic hammers are so designed that when the collecting electrodes have been raised slightly from their supports, a rapid sequence of sharp upward blows are delivered to the plunger 37 and hence to impact receiving member 34 and to all parts of the collecting electrodes so as to effectively jar the same and dislodge collected material therefrom. The jarring action is enhanced by the fact that the collecting electrodes are at that time lifted from and held off of their fixed supporting means and are therefore free to vibrate as independent units, each of such independent units comprising, in the present construction, four collecting electrodes. When the jarring action has been completed the valve 42 may be closed whereupon the air pressure is released from the pneumatic hammers 36 and the plungers returned to their normal positions, allowing the upper frame members 7 to again come to rest upon their supports 21.

In a similar manner the high tension or discharge electrode system may be jarred by opening valve 77, whereupon plunger 74 engages impact receiving member 72 and lifts the transverse frame members 51 and the discharge electrodes carried thereby off of the supporting brackets 54. A series of sharp upward blows are delivered through the plunger 74 to the discharge electrode system in the same manner as in the case of the collecting electrode system. When the discharge electrodes are raised from their supports the discharge members 46 slide upwardly through the rigid frame members 48 and 49, and the discharge electrodes are free to vibrate as an independent unit, thus giving a highly effective jarring action as in the case of the collecting electrodes. The collecting and discharge electrode systems of any section of the precipitator may be jarred separately or simultaneously, and two or more sections may also be jarred simultaneously if desired.

A further advantage of the above-described jarring means, in the case of the high tension electrode system, is that the plungers 74 are sufficiently removed from the impact receiving members 72, when not in operation, to provide an air gap sufficient to prevent arcing or short-circuiting at this point. It is essential that this clearance be provided for in the mounting of pneumatic hammers 73.

We claim:

1. In an apparatus for electrical precipitation, collecting electrode means, means normally supporting said collecting electrode means in operative position, and jarring means operable to raise said collecting electrode means off of said supporting means and to subject the same to a jarring action while holding the same off of said supporting means.

2. In an apparatus for electrical precipitation, discharge electrode means, means normally supporting said discharge electrode means in operative position, and jarring means operable to raise said discharge electrode means off of said supporting means and to subject the same to a jarring action while holding the same off of said supporting means.

3. In an electrical precipitator, collecting electrode means, discharge electrode means, means normally supporting said collecting electrode means and said discharge electrode means in position opposite one another and electrically insulating said electrode means from one another, jarring means operable to raise said collecting electrode means off of the supporting means therefor and to jar the same while held in such position, and jarring means operable to raise said discharge electrode means off of the supporting means therefore and to jar the same while held in such position.

4. In an apparatus for electrical treatment of gases containing suspended matter, electrode means, means normally supporting said electrode means while permitting said electrode means to be raised therefrom, impact receiving means connected to said electrode means, means movable upwardly, from a position beneath and out of contact with said impact receiving means, to a position to engage said impact receiving means and raise said electrode means off of said supporting means, and pneumatically operated means for raising said upwardly movable means to said last named position and for imparting a rapid vibrating motion thereto while in said position.

5. In an apparatus for electrical treatment of gas containing suspended matter, discharge electrode means, means normally supporting said discharge electrode means and electrically insulating the same from the remainder of the apparatus, impact receiving means connected to said discharge electrode means, jarring means normally separated from said impact receiving means by an air gap sufficient to substantially prevent electric discharge therebetween, and means for bringing said jarring means into engagement with said impact receiving means in such manner as to raise said discharge electrode means off of the supporting means therefor and to jar the same while held in such position.

In testimony whereof we have hereunto subscribed our names this 2nd day of September, 1927.

FLOYD H. VIETS.
CHARLES H. WEISKOPF.